United States Patent [19]

Drefahl

[11] Patent Number: 4,534,142
[45] Date of Patent: Aug. 13, 1985

[54] ROOF COVERING

[76] Inventor: Jens Drefahl, Amselweg 18a, 6458 Rodenbach 2, Fed. Rep. of Germany

[21] Appl. No.: 276,512

[22] Filed: Jun. 23, 1981

[30] Foreign Application Priority Data

Jun. 30, 1980 [DE] Fed. Rep. of Germany ....... 3024672

[51] Int. Cl.³ .............................................. E04B 7/02
[52] U.S. Cl. ......................................... 52/90; 52/408; 47/66
[58] Field of Search ..................... 52/90, 11, 302, 303, 52/309.1, 18, 750, 169.1–169.6, 630, 408, 410, 169.14, 173 R; 119/15, 51 R; 47/39, 1 R, 79, 47, 56, 9, 66

[56] References Cited

U.S. PATENT DOCUMENTS 509751 11/1893 Mandeville ............................ 52/750

FOREIGN PATENT DOCUMENTS

| 870173 | 3/1953 | Fed. Rep. of Germany | 52/90 |
| 630017 | 12/1961 | Italy | 52/408 |
| 601607 | 12/1977 | Switzerland | 52/408 |
| 1002620 | 6/1965 | United Kingdom | 52/750 |
| 1475682 | 6/1977 | United Kingdom | 47/56 |

Primary Examiner—Donald G. Kelly
Assistant Examiner—Naoko N. Slack
Attorney, Agent, or Firm—Max Fogiel

[57] ABSTRACT

A roof covering for greening an inclined roof comprises a water-impermeable roof skin, a holding structure placed loosely on the roof, holding projections distributed on said holding structure and engaging in a plant-carrying layer, a tension-resistant filter layer beneath the holding projections, and a drainage underneath said filter layer and having distributed spacers in contact with said filter layer.

13 Claims, 4 Drawing Figures

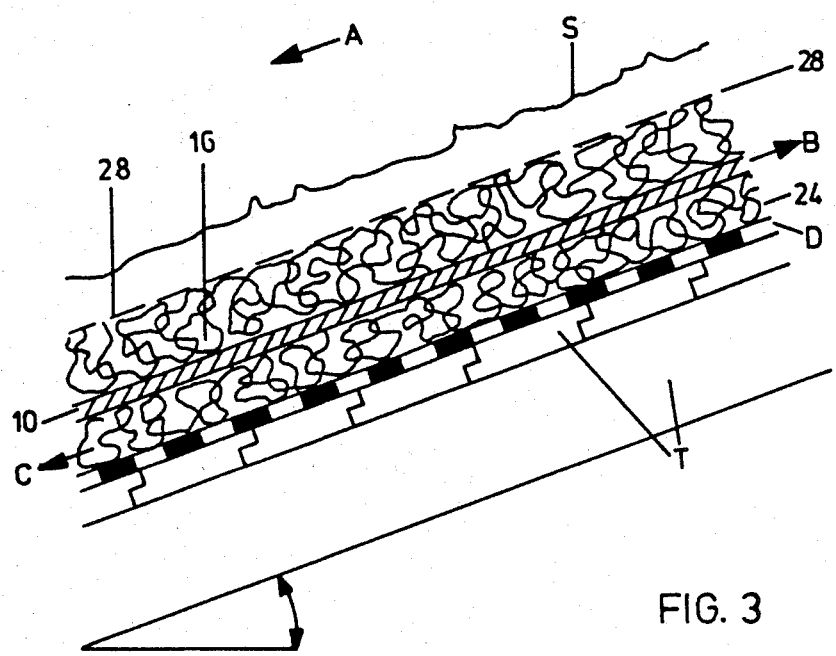
FIG. 3
FIG. 4
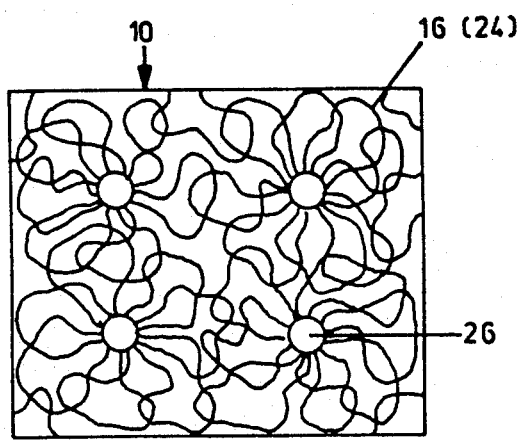

ROOF COVERING

DESCRIPTION

The invention relates to a roof cover for greening of a cold or warm inclined roof having a supporting structure and a water-impermeable roof skin, with a layer, such as a plant layer, to be applied to the upper side.

Greened inclined roofs have substantial advantages compared to the conventional inclined roof. Greening of an inclined roof leads to a substantial additional heat respectively cold protection and to a more favorable room climate of a thus outfitted building; further to climate improvements and optical beautification of the surroundings, especially in dense cityscapes, better room utilization, and more. Roof greening has heretofore been used only for flat roofs and for very slightly inclined roofs, since technical building problems arise in case of greater roof inclinations.

The purpose of the present invention is to so construct a roof covering of the type mentioned in the preamble, with simple and inexpensive means, that it permits reliable greening of inclined roofs of even relatively large inclination, e.g. more than 30°, and assures quick installation on the building while avoiding technical problems. The roof covering is to permit retrofitting of existing inclined roofs without any danger of damage to the same.

The invention is based on the concept to so construct the roof covering that the thrust forces of the roof covering itself and of the upper layer, such as plates, soil with plants and the like, which act in the direction of roof inclination, are independently absorbed by the roof skin of the actual roof structure and are conducted—relative to the roof skin—largely friction-free to carrying building parts.

To solve this problem a roof covering of the type mentioned in the preamble is inventively characterized by a non-rotting holding structure which is independent of the subjacent roof structure and of the roof skin to which it can be applied loosely and largely free of tension respectively friction, to be secured only at the roof beam side and/or the gutter side against sliding. In an inclined roof, the roof beam side corresponds to the top edge of the roof, whereas the gutter side corresponds to the bottom edge of the roof where rain water will run off the roof. The non-rotting holding structure has holding projections which are distributed over the surface and frictionally and thrust-absorbingly engage in the layer to be applied to the upper side; thrust-conducting means connects the same with the roof beam and/or the gutter side and transfers the occurring thrust via tension and/or pressure forces. Such a roof covering, which is relatively inexpensive and decidedly advantageous, permits even for stronger roof inclinations a roof greening of all around well visible roof scapes. Since the thrust forces of the roof covering, the layer to be applied thereon, and the roof greening are conducted fully independently of the roof skin and with a large degree of friction-relief relative thereto to the roofbeam and/or gutter regions, there is no danger at all of damage to or of special stress to the roof skin. In connection with the layer to be applied the roof covering increases thermal insulation, protects against weather-caused influences such as UV radiation, and leads to a drastic increase in living comfort and of the external appearance of individual buildings and dense cityscapes.

Many possibilities exist for the construction, number and distribution of the holding projections. It is important for the layer to be applied, such as a plant carrying layer, to be reliably prevented from sliding in that the developing thrust is transmitted via the thrust conducting means to the roof and/or gutter sides.

According to one embodiment the holding projections are constructed as individual thrust-conducting means or via intermediate members, e.g. webs, ribs, pins, hooks, corrugated elements or the like. If such holding projections are offset in roof inclination direction, then—in dependence upon the roof inclination and the kind of layer to be applied—it is not absolutely necessary to provide holding projections which continuously extend over the width of the roof. An appropriately offset arrangement of holding projections prevents straight-line sliding of regions of the layer to be applied, and a wavy sliding of the layer is largely prevented by developing inner friction. The greater the roof inclination and the flowability of the layer to be applied, the greater the requirements which must be made of the holding projections relative to the thickness of the layer to be applied, the surface density and the shaping of the holding projections. In case of slight roof inclination, a slight thickness of the layer to be applied, and a low flowability of the same, relatively insignificant surface roughnesses may suffice to hold the layer, for which e.g. low nubs or the like are suitable. Accordingly, the holding characteristics of the holding projections and thus the costs of the holding structure, can be accommodated to the prevailing requirements.

A particularly advantageous embodiment is characterized in that the holding projections in their totality are constructed as a three-dimensional thrust-absorbing structure of linked fibers or strands with interspaces for accommodation of at least the lower region of the layer to be applied, the structure being at least in regions connected with the thrust-conducting means. The three-dimensional structure may be of synthetic monofilaments. It is also possible to provide as the thrust-absorbing structure a three-dimensional braid or weave of fibers or strands, or else an irregular interlinking of fibers and strands. Such a three-dimensional structure permits a large-area, reliable retention of the layer to be applied even with greater roof inclinations and despite unfavorable flow characteristics of the layer-to-be-retained, particularly if the thickness of the three-dimensional structure corresponds at least approximately to the thickness of the layer to be applied. The individual fibers or strands interpenetrate the layer in root-like manner with a relatively large spacing from each other as related to the thickness of the fibers or the strands, so that plant growth, moisture exchange and matter exchange are practically unhindered in the layer. Relative to their lengths and paths the linked fibers or strands can be largely as desired, if care is only taken to assure that they are sufficiently strong and are sufficiently strongly anchored to assure a claw-like or root-like retention of the layer to be applied.

In a further development an armature, such as a grid, which positionally stabilizes the linked fibers or strands, can be provided at the interior and/or at the upper side of the thrust-absorbing structure. Such an armature grid, which may for example have a raster of about 10 cm by 10 cm, does not hinder plant growth and only assures that the region of the linked fibers or strands which are remote from the thrust-transmitting means, is held respectively stable. Such armoring is particularly advantageous if relatively large layer-thickness and roof inclination are used, since in this case especially large thrust forces must be absorbed.

The thrust-transmitting means may consist of at least one compression and/or tension-resistant plate. For thrust-transmission this plate is anchored at the gutter side and/or the roof-beam side. More advantageous conditions are, however, obtained if the thrust-transmitting means preferably consists of at least one tension-resistant mat. This has the advantage that rolling and unrolling of the thrust-transmitting means, respectively of the entire holding structure, enables simple transportation, storage and application to an inclined roof. Similar conditions also obtain if the thrust-transmitting means consists of tension-resistant tension strands which are connected—as by braiding or gluing—with the linked fibers or strands of the three-dimensional thrust-absorbing structure. Compared to a continuous mat this embodiment may have the advantage of a further saving of material.

In a further development, means are provided for connecting the thrust-conducting means to the gutter side and/or the roof-beam side of the inclined roof. These means may be in many forms. In lieu thereof or in addition it is also possible to provide a tension-resistant mat to be continuously placed over both halves of a saddle roof, as a thrust-conducting means which is held on the inclined roof by weight equalization over the roof beam. In this embodiment, any anchors between the holding structure and the inclined roof could additionally be omitted, since the roof covering reliably rests on the inclined roof due to its weight alone.

In a further development a filter layer is preferably provided underneath the holding projections. A tension-resistant mat of the holding structure which serves as the thrust-transmitting means may simultaneously be constructed as a filter mat. This filter layer assures that only filtered water can penetrate from the layer-to-be-applied to the subjacent regions in which there is preferably a drainage provided. This serves primarily for carrying off the excess water from the layer to be applied and can be constructed as a part of the holding structure. Such a drainage is advantageous, especially if the layer to be applied does not itself have adequate drainage characteristics, which could be obtained by coarser layer components incorporated at least in the lower layer region. Also, the drainage permits watering from below.

In one embodiment the drainage has distributedly-arranged lower-sided spacers on the filter layer. These assure that a space remains beneath the filter layer which is adequate for drainage.

A particularly preferred embodiment has a tension-resistant filter mat as the thrust-transmitting means with three-dimensional structures of linked fibers or strands with interspaces, the structures being provided at the upper and lower sides and being at least regionally connected to the filter mat and the interspaces at the upper side serving to accommodate the layer to be applied while those of the lower side serve to receive filtered surface water to be carried off and/or flood water for watering from below. An armature, such as a grid, which positionally stabilizes the fibers or strands, can be provided above and/or below the fiber mat. Such a fiber mat with two-sided root-like spatial structures is particularly advantageous, since it combines all characteristics of an efficacious holding structure and is easily handled in terms of rolling it up. After a roof-beam side positioning of the holding structure roll, the individual leafs of the roof cover can be unrolled under the influence of gravity, in case of a saddle roof along both saddle roof halves. Such an installation is possible in the shortest time and requires only a roof-beam side securing of the holding structure against sliding, for example by an over-the-roof-beam weight equalization of the opposing holding-structure regions of the two saddle-roof halves.

Preferably, a drainage is used having an adequate back-flow formation and/or with individually installed water-guiding structures leading from the underside to the upper side of the drainage, for watering from below of the layer to be applied to the upper side, by flood water admitted at the roof beam. Compared to surface watering, this type of watering has the essential advantage that the water is directly supplied to the water-aspirating plant roots, and cannot evaporate at the surface of the layer. This assures economical watering even in hot, dry climates.

In a further development it is preferred to use a tension-resistant mat serving as the thrust-transmission means, which has moisture-storing characteristics. Thereby, an approximately even moisture supply can be maintained in the layer to be applied, and plant-growth be advanced, despite an interruption of watering at times.

It is also possible to provide under the holding structure above the roof skin, a thermal insulating layer if this is desired to increase the total insulation of the roof. Further it can be advantageous to arrange a glide layer under the holding structure and/or thermal insulating layer and above the roof skin. This permits a proper separation respectively freedom of friction between the roof covering and the roof skin, which is necessary so that no thrust-caused forces are transmitted to the roof skin. Such a glide layer can always be omitted if the underside of the holding structure is itself already constructed to be sufficiently friction-free.

According to a further development a border can be provided for the holding structure, and this border is preferably constructed as a U-profile embracing the edge of the holding structure. Such a border serves for a clean delimitation and for a proper surrounding of the parts of the holding structure, especially of linked fibers or strands of the same.

In another embodiment the holding structure is configurated as a water-permeable—such as a perforated—corrugated element whose corrugations extend transverse to the roof inclination direction or slightly inclined thereto. Such a holding structure, also, permits in many instances an adequate thrust transmission and moreover a run-off of excess water. In the case of perforation the water can trickle through the holding structure, while in the case of inclined corrugation depressions the water can be led in these to the roof edge if the material of the layer to be applied, which lies in these depressions, has sufficient drainage characteristics.

Still more advantageous conditions are obtained if the drainage under the holding structure has as a spacer a corrugated element whose corrugation depressions run in the roof inclination direction or skew thereto. The water to be carried off, or to be supplied from below for watering, can flow in the corrugation depressions of the drainage. If corrugated elements are used for the upper holding structure and for the lower drainage, then these—mutually connected—can be so angularly offset relative to each other that the depressions of the upper holding structure are locally supported on the corrugation ribs of the lower corrugated elements. In place of this it is also possible to so laterally shift the two corrugated elements relative to one another, while giving them identical angular orientation, that the depressions of the upper corrugated element rest over their entire length on the corrugation ribs of the lower element. However, this embodiment is feasible only if the depressions of the upper and lower elements are inclined to the roof inclination direction, so that on the one hand it is possible to absorb the thrust forces of the layer to be applied and on the other hand to remove and/or supply water through the drainage. In addition, the upper corrugated element must be water permeable, e.g. consist of a filter layer or be perforated.

The invention will hereafter be described in more detail with reference to a few, schematically illustrated embodiments.

FIG. 3 shows, in a view similar to FIG. 1, an embodiment modified as compared to FIG. 2 with three-dimensionally linked fibers or strands forming a drainage at the underside; and FIG. 4 shows a part of the holding structure from FIGS. 2 and 3 in top plan view.

Figure 1:
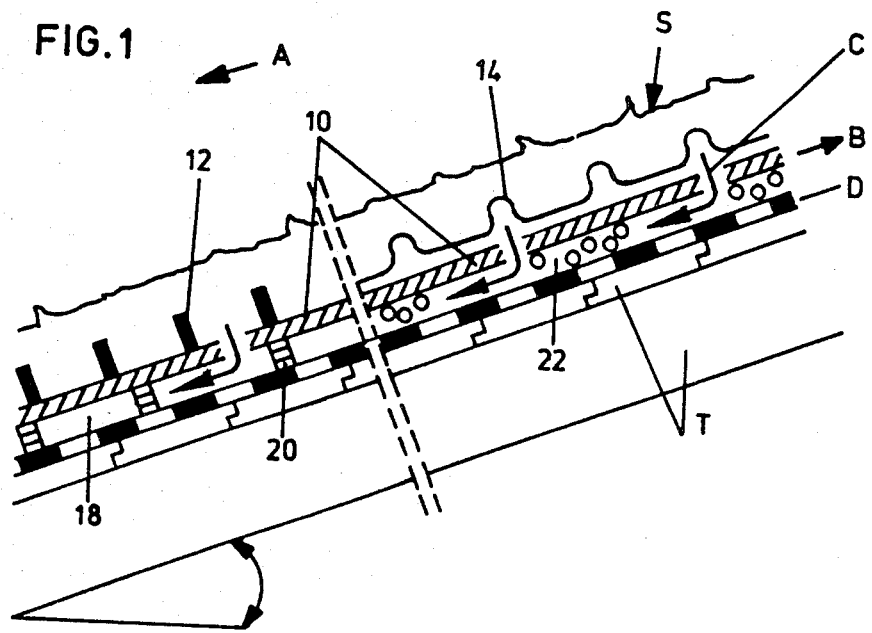
FIG. 1 shows two embodiments of a roof covering according to the invention in a partial section in roof inclination direction.

According to FIG. 1 a roof cover according to the invention rests on a roof skin D above a supporting structure T and has a thrust-transmitting means 10 in form of a tension-resistant filter mat, at the upper side of which are secured holding projections 12, 14 which extend into a layer S to be applied. While the holding projections 12 may, for example, be pins, ribs or the like, the holding projections 14 are corrugated elements. The layer S to be applied, such as a plant-carrying layer, enters into the spaces between the holding projections and is prevented by the same against sliding in roof inclination direction. The thrust forces acting in direction of arrow A are absorbed by the holding projections 12, 14 and transmitted to the filter mat, which in turn transmits the thrust as tensile stress to the roof-beam side. The thrust-transmitting means 10 is secured at the roof-beam side so that the thrust forces acting in arrow direction A and the tensile forces acting in arrow direction B cancel each other out.

A drainage is located beneath the water-permeable filter mat of the thrust-transmitting means. At the left side of FIG. 1 the drainage is so constructed that the filter mat is prevented by perforated spaces 20 from lying flat on the roof skin D. Thus, the water running downwardly out of the layer S through the filter mat, can flow off in the direction of the arrow C. At the right side of FIG. 1 it is only shown that a drainage 22 may also be prefabricated commercially of available drainage plates or the like.

Figure 2:
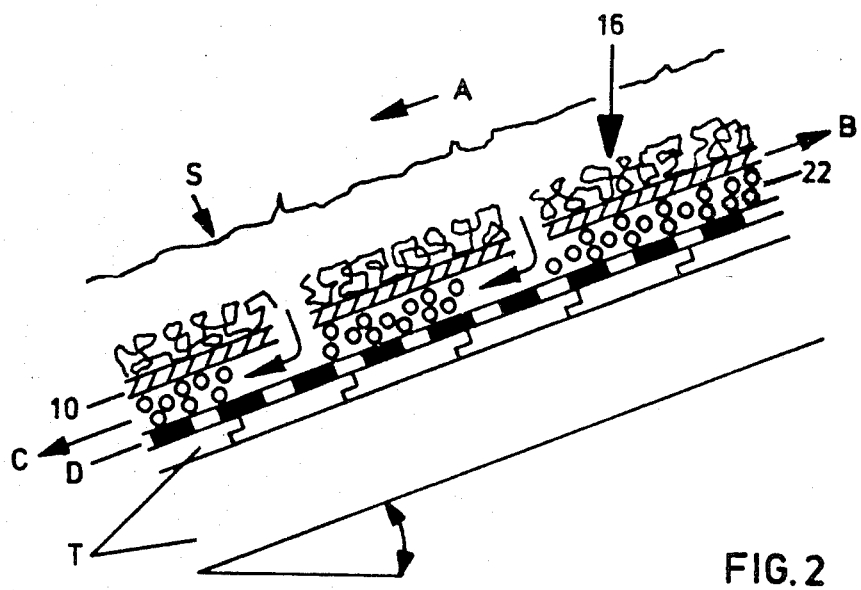
FIG. 2 shows, in a view similar to FIG. 1, a further embodiment of a roof covering with upper-side holding projections in form of three-dimensionally linked fibers or strands.

FIG. 2 shows that the roof cover resting on the roof skin D above the supporting structure T of the roof also has a thrust-transmitting means 10 in the form of a tension-resistant filter mat, which absorbs the thrust forces acting in arrow direction A by a tension mounting acting in arrow direction B. In the embodiment of FIG. 2, the filter mat 10 rests on a drainage 22 of prefabricated, commercially available drain plates above the roof skin D. At its upper side the filter mat has, as holding projections, a three-dimensional structure 16 of linked fibers or strands which are at least locally connected with the filter mat. These may be completely of irregular form and make it possible for the components of the layer S to be applied, to enter into the interspaces of the three-dimensional structure, whereby a root-like anchoring is obtained between the layer S and the linked fibers or strands. These serve to prevent the layer S from sliding in the roof inclination direction and for the thrust forces acting in arrow direction A to be countered by tensile forces in arrow direction B. The water to be conducted out of the layer S can flow off in the drainage 22 after filtering through the filter mat.

Compared to the embodiment of FIG. 2, the embodiment of FIG. 3 is modified in only two aspects. On the one hand, the three-dimensional thrust-absorbing structure 16 of the linked fibers or strands contains a grid-like armor 28 spaced above the filter mat of the thrust-transmitting means 10. This armoring grid 10, having e.g. a raster of 10 cm, assures even in the event of greater thickness of the layer S to be applied, and thus greater thickness of the three-dimensional thrust-absorbing structure 16, that the outer fiber or strand regions thereof are sufficiently stable, i.e. cannot be too far shifted in roof inclination direction by the developing thrust forces. Also, the embodiment of FIG. 3 differs from that of FIG. 2 in that the drainage 24 is constructed similar to the upper-side structure 16, i.e. of three-dimensional linked fibers or strands. Even in the event of a thin layer thickness of the drainage 24 these assure sufficient drainage characteristics, because of the large interspaces of the linked structure. If desired, a stabilization corresponding to the armor 28 can be provided in the lower region of the drainage 24, also.

FIG. 4 shows a possible embodiment for the three-dimensional linked fibers or strands of the upper side thrust-absorbing structure 16 and/or drainage 24. The not separately designated fibers or strands can be three-dimensionally woven, braided, but also be linked in other ways, such as completely irregularly. According to FIG. 4 the linked spatial structure can in local areas 26 be fixedly connected with a thrust-transmitting means 10 in form of a tension-resistant mat or the like. Individual fiber bundles can be associated with the local area 26, which are linked with themselves and if desired also with adjacent fiber bundles. The fibers or strands may be of different non-rotting materials, for example synthetic monofilaments.

In connection with the illustrated embodiment it must be pointed out that these are only exemplary and can be modified in many ways and accommodated to the respective requirements. Important is that the thrust acting in arrow direction A due to the roof covering with the applied layer S is dissipated to the roof-beam side and/or the gutter side independently of the roof skin D in the arrow direction B. If necessary, a separate glide layer between the roof covering and the roof skin must be provided to assure that friction between these parts is at least largely avoided. If the layer to be applied already has sufficient drainage characteristics, an underside drainage might be omitted, so that in this case in the embodiments of FIGS. 1–3 the tension-resistant mat of the thrust-conducting means—which in this event need have no filtering ability—can rest directly or via a glide layer on the roof skin D.

I claim:

1. Roof covering for greening an inclined cold or warm roof having a supporting construction resting on walls and a water-impermeable roof skin, said roof covering comprising: a plant carrying layer applied on top of the roof; a non-rotting holding structure which is independent of the subjacent roof structure and of the roof skin, said holding structure being placed on the inclined roof loosely and largely free of tension and friction of the roof and being secured only at a roof beam against sliding; holding projections distributed over an upper surface of said holding structure and frictionally and thrust-absorbingly engaging in the plant-carrying layer to be applied to the upper side; said holding structure conducting thrust and connecting said plant-carrying layer with the roof beam; a filter layer beneath said holding projections; a drainage underneath said filter layer; said drainage being part of said holding structure; said drainage having distributed spacers in contact with said filter layer.

2. Roof covering for greening an inclined cold or warm roof having a supporting construction resting on walls and a water-impermeable roof skin, said roof covering comprising: a plant carrying layer applied on top of the roof; a non-rotting holding structure which is independent of the subjacent roof structure and of the roof skin, said holding structure being placed on the inclined roof loosely and largely free of tension and friction of the roof and being secured only at a roof beam against sliding; holding projections distributed over an upper surface of said holding structure and frictionally and thrust-absorbingly engaging in the plant-carrying layer to be applied to the upper side; said holding structure conducting thrust and connecting said plant-carrying layer with the roof beam; said holding structure comprising a water-permeable corrugated element with depressions extending substantially transverse to the roof inclination.

3. Roof covering for greening an inclined cold or warm roof having a supporting construction resting on walls and a water-impermeable roof skin, said roof covering comprising: a plant carrying layer applied on top of the roof; a non-rotting holding structure which is independent of the subadjacent roof structure and of the roof skin, said holding structure being placed on the inclined roof loosely and largely free of tension and friction of the roof and being secured only at a roof beam against sliding; holding projections distributed over an upper surface of said holding structure and frictionally and thrust-absorbingly engaging in the plant-carrying layer to be applied to the upper side; said holding structure conducting thrust and connecting said plant-carrying layer with the roof beam; said holding projections in their totality comprising a three-dimensional structure of linked fibers with interspaces between them for accommodation of at least a lower region of the plant-carrying layer to be applied; a tension-resistant filter layer beneath said holding projections; a drainage underneath said filter layer; said drainage being part of said holding structure; said drainage having distributed spacers in contact with said filter layer.

4. Roof covering according to claim 3, and grid means for positionally stabilizing linked fibers at an upper side of said structure of linked fibers.

5. Roof covering according to claim 3, and a tension-resistant filter layer placed continuously on both halves of a saddle inclined roof as part of said thrust-conducting means and held on the inclined roof by balanced weight of the tension-resistant filter layer over the roof beam.

6. Roof covering according to claim 3, wherein said three-dimensional structure comprises synthetic monofilaments.

7. Roof covering according to claim 3, wherein said holding structure has a three-dimensional weave of fibers.

8. Roof covering according to claim 3, wherein said holding structure has an irregular linking of fibers.

9. Roof covering according to claim 3, and grid means for positionally stabilizing linked fibers within said holding.

10. Roof covering according to claim 3, wherein said filter layer comprises tension-resistant strands connected with linked fibers of said three-dimensional structure of linked fibers.

11. Roof covering according to claim 3, and grid means next to said filter mat for positionally stabilizing fibers.

12. Roof covering according to claim 3, and a tension-resistant filter layer with moisture-storing characteristics.

13. Roof covering according to claim 3, and a glide layer beneath said holding structure and a thermal damping layer above said roof skin.

* * * * *